June 10, 1969     J. C. LOGOMASINI     3,449,477
METHOD OF FORMING PLASTIC ARTICLES HAVING FOAMED CORES
Filed Jan. 3, 1968
FIG. I
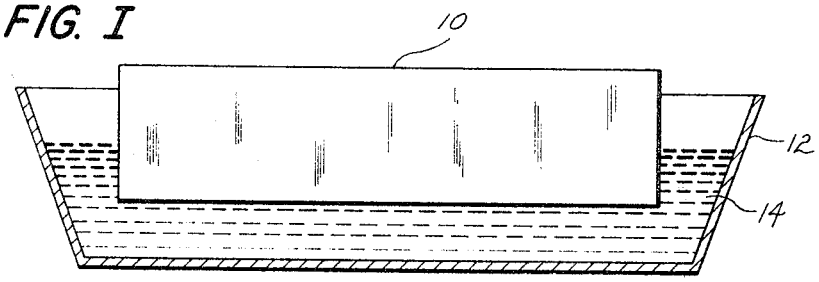
FIG. II
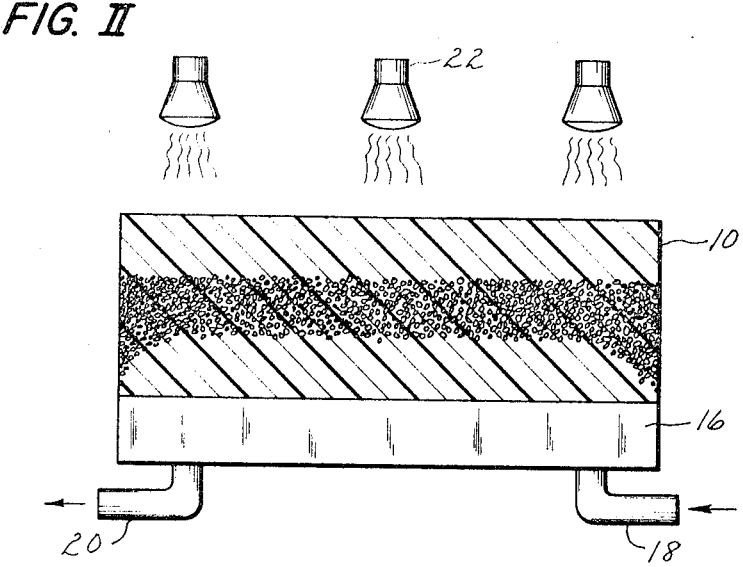
FIG. III
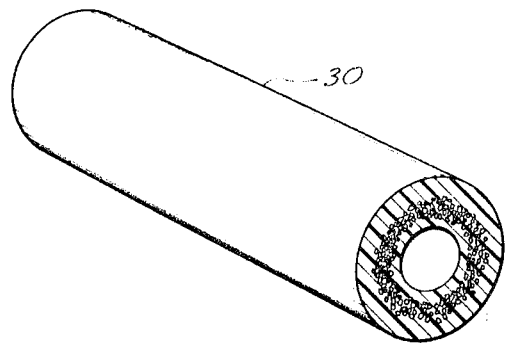
FIG. IV
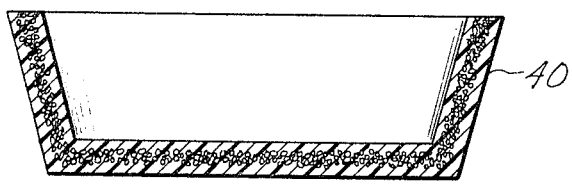
INVENTOR.
James C. Logomasini

United States Patent Office 3,449,477
Patented June 10, 1969

---

3,449,477
METHOD OF FORMING PLASTIC ARTICLES HAVING FOAMED CORES
James C. Logomasini, Wilbraham, Mass., assignor to Monsanto Company, St. Louis, Mo., a corporation of Delaware
Filed Jan. 3, 1968, Ser. No. 695,415
Int. Cl. B29d 9/00
U.S. Cl. 264—45         2 Claims

---

ABSTRACT OF THE DISCLOSURE

The present invention relates to plastic articles having internally foamed cores produced by partially steeping a plastic article in an expanding agent and the cooling surface portions of the plastic article which were in contact with the expanding agent while heating other portions of the plastic article.

---

The present invention relates to the manufacture of foamed plastic articles and more particularly to internally foamed plastic articles.

In U.S. Patent No. 3,262,625, there is disclosed a method for partially foaming surface portions of a plastic article by treating the plastic surface with an expanding agent and subsequently heating to foam the surfaces which were treated. The present invention involves a method whereby internal portions of a plastic article may be foamed without foaming the surface of the plastic.

The primary object of the present invention is to manufacture a plastic article having an internally foamed core.

It is another object of the present invention to provide method for producing an internally foamed plastic article of manufacture.

These and other objects are accomplished by partially exposing a plastic article to an expanding agent which is absorbable by the plastic and subsequently cooling surface portions which were in contact with the expanding agent while heating other portions of the plastic article such that internal portions of the plastic will foam.

The following drawings are provided for the purpose of illustrating at least one embodiment of the present invention.

FIG. I is a side view of a plastic block being partially steeped in a liquid expanding agent.

FIG. II is a side view of the plastic block of FIG. I after steeping wherein the plastic article is being heated while the side which was exposed to the expanding agent is being cooled.

FIG. III is a perspective view of a conduit which has been internally foamed in accordance with the present invention.

FIG. IX is a side view of a container in section which has been internally foamed in accordance with this invention.

Referring to the drawings and more specifically FIG. I, there is shown a plastic block 10 partially submerged in a steeping container 12 containing a liquid expanding agent 14. After the expanding agent has been absorbed into the plastic block to a predetermined depth dependent on the length of steeping time, the block is removed from the bath and placed with the steeped side down on a cooling table 16 such as shown in FIG. II which is cooled by circulation of a cold medium through channels within the table 16 via inlet and outlet conduits 18 and 20, respectively. In this position the plastic block is heated from above by heating means such as the infrared lamps 22 which are illustrated in FIG. II.

This simultaneous heating and cooling of the plastic block causes the inner portion of the plastic block to foam resulting in a panel having an internally foamed core integrally connected to the unfoamed outer portions of the panel. The portion of the plastic adjacent the cooling surface does not foam because the temperature of the plastic in this zone is not high enough to convert the liquid expanding agent to a gaseous state.

FIG. III illustrates another structure, i.e., a conduit 30 which has been internally foamed employing the above described method. To form this structure, the conduit may be exposed to the expanding agent from either the inside or outside of the conduit and heated and cooled by any means adaptable to the conduit such as for example, circulating a heating or cooling gas through the conduit. In a similar manner, the container 40 of FIG. IV may be internally foamed.

In general, any substantialy thermoplastic resin material capable of absorbing an expanding agent may be treated to produce an internally foamed article such as for example, polystyrene which may or may not be rubber modified and the like.

The expanding agent may be of any type which is absorbable by the plastic being treated and convertible to a gaseous state below the melting point temperature of the plastic. Freon (trichlorofluoromethane) performs quite well for polystyrene homopolymers and rubber modified interpolymers. In general, the expanding agent is a liquid.

The depth of penetration into the plastic by the expanding agent will generally depend on the length of time of steeping which may run anywhere from a few seconds to a half-hour or more depending on the particular plastic and expanding agent.

In general, it is preferable to allow the steeped plastic to dry at least at its exposed surface areas prior to simultaneous heating and cooling to foam.

The extent of internal foaming will be dependent to a large degree on the rates of heating and cooling applied. Some experimentation at different hot and cold temperature levels is generally necessary to obtain the desired cross-section of foamed and unfoamed plastic. Any method of heating and/or cooling may be employed which is effective, i.e., conduction, convection, radiation and the like. Dielectric heating in certain instances can be very effective.

The shape of the plastic may vary in any fashion although it is obviously easier to internally foam symmetrical articles such as panels, slabs and the like which may be used to fabricate structures similar to laminated foamed sandwiches but which are much stronger due to the integral nature of foamed/unfoamed plastic. Consequently, the partially foamed structures of the present invention find application in areas where the foam-solid plastic laminates are being presently used or contemplated with the added advantages of higher strength and low cost of production as well as in many other areas where such characteristics are desirable such as conduits, containers and the like.

What is claimed is:

1. A method of producing an article having a wall with opposing unfoamed surfaces and an internally formed core which comprises exposing a portion of a wall of a plastic article including one of two exposing unfoamed surfaces thereof to an expanding agent which is absorbable by the plastic and convertible to a gaseous state below the melting point temperature of the plastic to partially impregnate said wall with said expanding agent and create an expandable zone between said two opposing unfoamed surfaces extending to the depth of impregnation of said wall by said expanding agent and subsequently cooling a first portion of said expandable zone immediately adjacent to and including said one opposing surface to prevent converting the expanding agent to a gaseous state in said first portion of the expandable zone while subjecting the other of the two opposing unfoamed surfaces to a heat source to increase the temperature of a second inner portion of said expandable zone above the temperature at which the expanding agent converts to the gaseous state to foam said second inner portion of the expandable zone and form said core.

2. The method according to claim 1 wherein the wall portion of the plastic article is exposed to an expanding agent by dipping the plastic article in a liquid expanding agent.

References Cited

UNITED STATES PATENTS

| | | | |
|---|---|---|---|
| 3,330,784 | 7/1967 | Anspon | 161—159 XR |
| 3,345,439 | 10/1967 | Everard et al. | 264—26 |
| 3,168,207 | 2/1965 | Noland et al. | 264—48 XR |
| 3,260,781 | 7/1966 | Lux et al. | 264—48 XR |
| 3,299,192 | 1/1967 | Lux | 264—48 |
| 3,317,363 | 5/1967 | Weber | 264—48 XR |
| 3,324,210 | 6/1967 | Aykanian | 264—45 |

PHILIP E. ANDERSON, *Primary Examiner.*

U.S. Cl. X.R.

18—5; 156—79; 161—161; 264—26, 52, 53, 348

PO-1050
(5/69)

UNITED STATES PATENT OFFICE
CERTIFICATE OF CORRECTION

Patent No. 3,449,477                              Dated   June 10, 1969

Inventor(s)    James C. Logomasini

It is certified that error appears in the above-identified patent and that said Letters Patent are hereby corrected as shown below:

Column 1, line 16, after "and" change "the" to read "then".

Column 1, line 56, change "IX" to read "IV".

Claim 1, line 2, change "formed" to read "foamed".

Claim 1, line 4, change "exposing" to read "opposing".

SIGNED AND
SEALED
DEC 23 1969

(SEAL)
Attest:

Edward M. Fletcher, Jr.
Attesting Officer

WILLIAM E. SCHUYLER, JR.
Commissioner of Patents